US011114922B2

(12) United States Patent
Tims

(10) Patent No.: US 11,114,922 B2
(45) Date of Patent: Sep. 7, 2021

(54) ROTOR FOR AN ELECTRIC MOTOR OR GENERATOR

(71) Applicant: PROTEAN ELECTRIC LIMITED, Surrey (GB)

(72) Inventor: Christopher Tims, Hampshire (GB)

(73) Assignee: Protean Electric Limited

( * ) Notice: Subject to any disclaimer, the term of this patent is extended or adjusted under 35 U.S.C. 154(b) by 38 days.

(21) Appl. No.: 16/327,388

(22) PCT Filed: Aug. 18, 2017

(86) PCT No.: PCT/GB2017/052452
§ 371 (c)(1),
(2) Date: Feb. 22, 2019

(87) PCT Pub. No.: WO2018/037213
PCT Pub. Date: Mar. 1, 2018

(65) Prior Publication Data
US 2019/0181728 A1    Jun. 13, 2019

(30) Foreign Application Priority Data
Aug. 23, 2016 (GB) .................................... 1614354

(51) Int. Cl.
*H02K 11/215* (2016.01)
*H02K 11/33* (2016.01)
(Continued)

(52) U.S. Cl.
CPC ............. *H02K 11/215* (2016.01); *H02K 1/27* (2013.01); *H02K 7/06* (2013.01); *H02K 11/33* (2016.01); *H02K 1/2786* (2013.01); *H02K 1/28* (2013.01)

(58) Field of Classification Search
CPC ...... H02K 1/28; H02K 1/2786; H02K 11/215; H02K 11/33; H02K 1/27; H02K 7/06
(Continued)

(56) References Cited

U.S. PATENT DOCUMENTS 4,137,884 A * 2/1979 Odazima .............. H02K 1/2786
123/149 D
5,565,721 A * 10/1996 Knappe ................... G01P 3/487
310/156.22
(Continued)

FOREIGN PATENT DOCUMENTS

DE    29607484 U1    8/1996
GB    2483177 A    2/2012

OTHER PUBLICATIONS

European Patent Office, International Search Report, dated Oct. 30, 2017, WIPO, Rijswijk.
(Continued)

*Primary Examiner* — Ahmed Elnakib
(74) *Attorney, Agent, or Firm* — Allen, Dyer, Doppelt & Gilchrist, P.A.

(57) ABSTRACT

A rotor for an electric motor or generator, the rotor comprising a housing having a first surface on which a first set of magnets is mounted; and an annular clamping ring for retaining a second set of magnets to a second surface of the housing, wherein the position of the second set of magnets on the second surface allows the position of the first set of magnets to be determined, wherein the annular clamping ring includes a mounting point for allowing the annular clamping ring to be mounted to the housing for retaining the second set of magnets to the second surface, wherein the cross sectional area of the annular clamping ring is reduced (Continued)

in a region adjacent to the mounting point and wherein the annular clamping ring is mounted over the second set of magnets.

6 Claims, 7 Drawing Sheets

(51) Int. Cl.
*H02K 7/06* (2006.01)
*H02K 1/27* (2006.01)
*H02K 1/28* (2006.01)

(58) Field of Classification Search
USPC .............................................. 310/156.05, 71
See application file for complete search history.

(56) References Cited

U.S. PATENT DOCUMENTS

| | | | | |
|---|---|---|---|---|
| 6,680,553 | B1* | 1/2004 | Takano | H02K 3/50 |
| | | | | 310/156.05 |
| 8,283,833 | B2* | 10/2012 | Kondo | H02K 15/022 |
| | | | | 310/263 |
| 2006/0033388 | A1* | 2/2006 | Nayak | H02K 11/33 |
| | | | | 310/67 R |
| 2010/0320859 | A1* | 12/2010 | Himmelmann | H02K 1/2786 |
| | | | | 310/156.18 |
| 2011/0260566 | A1* | 10/2011 | Odvarka | H02K 1/2793 |
| | | | | 310/156.12 |
| 2014/0265970 | A1* | 9/2014 | Burke | G01D 5/145 |
| | | | | 318/400.38 |
| 2015/0228411 | A1* | 8/2015 | Owen | H01G 4/248 |
| | | | | 310/68 R |
| 2016/0254716 | A1* | 9/2016 | Kim | H02K 1/28 |
| | | | | 310/68 B |
| 2019/0156253 | A1* | 5/2019 | Malyack | G06Q 10/083 |
| 2019/0181728 | A1* | 6/2019 | Tims | H02K 1/27 |

OTHER PUBLICATIONS

European Patent Office, Written Opinion of the International Searching Authority, dated Mar. 1, 2018, WIPO, Rijswijk.
Intellectual Property Office, Search Report First, dated Oct. 12, 2016, Intellectual Property Office, South Wales.

* cited by examiner

ROTOR FOR AN ELECTRIC MOTOR OR GENERATOR

The present invention relates to a rotor for an electric motor or generator, in particular a mechanism for retaining a set of magnets within a rotor.

Permanent magnet synchronous electric motors operate via the production of a rotating magnetic field, which is typically formed via current flowing through coil windings mounted on a stator. The coil windings typically form a group of phase windings distributed around the stator that are coupled together. For a three phase electric motor or generator three sets of phase windings are connected together in either a star or a delta configuration.

A representation of a six phase electric motor or generator having six sets of phase windings connected in a star configuration is shown in FIG. 1, where one end of each of the windings are connected at a common point, known as a star point 100.

During operation of the electric motor or generator a different voltage phase is applied or generated across each group of phase windings. Accordingly, for an n-phase electric motor or generator an n-phase voltage is applied across the respective phase windings of the electric motor or generator.

The efficiency of a permanent magnet synchronous electric motor or generator is optimised by ensuring that the electrical phase, that is to say electrical phase angle, that is applied to the phase windings is synchronised with the magnetic field generated by permanent magnets, which are typically mounted on the rotor, such that the electrical phase angle is at a fixed phase offset to the magnetic field for a given torque/speed. In other words, the electrical phase angle is synchronised with the rotor magnetic flux angle.

To allow the electrical phase of the respective phase windings to be synchronised with the magnetic field, that is to say the rotor magnetic flux angle, generated by the permanent magnets mounted on the rotor, a ring of magnets or ring of multiple magnetic poles in the form of a commutation magnet ring is mounted on the rotor that has a matching configuration to the permanent magnets mounted on the rotor, which act as drive magnets, where the commutation magnets are used to estimate the rotor magnetic flux angle of the drive magnets.

Typically mounted on the stator is a Hall sensor that is arranged to measure the field strength from the commutation magnet ring. To allow the direction of the rotor to be determined and for improved accuracy a second Hall sensor is typically placed 90 electrical degrees away from the first Hall sensor.

As the rotor rotates relative to the stator the Hall sensor outputs an AC voltage signal that allows the rotor magnetic flux angle to be estimated. The rotor magnetic flux angle is determined from the signal output from the Hall sensor via trigonometric calculation. For a two Hall sensor configuration one Hall sensor represents the sine of the rotor flux angle and the second Hall sensor signal represents the cosine of the rotor flux angle. The output AC voltage signals have a frequency proportional to the speed of the rotor. By way of illustration, FIG. 2 represents the output from two Hall sensors mounted on the stator that have been separated by an electrical phase angle of approximately 90 degrees. As illustrated, two sinusoidal signals are output, where one output signal is shifted by approximately 90 degrees with respect to the other output signal.

To ensure the commutation magnet ring is retained in place on the rotor while also minimising the risk of the commutation magnet ring moving relative to the permanent drive magnets a clamping ring is typically mounted over the commutation magnet ring, thereby allowing the commutation magnet ring to be maintained in a fixed position relative to the permanent drive magnets. Typically the clamping ring is attached to the rotor using a plurality of mounting points placed at specific intervals around the circumference of the clamping ring. By way of illustration FIG. 3 shows a clamping ring mounted to a rotor using three mounting points.

However, as illustrated in FIG. 3, the mounting of the clamping ring 30 to the rotor 32, where only the portion of the rotor to which the clamping ring is mounted is illustrated in FIG. 3, can result in the clamping ring 30 becoming distorted, causing a crinkling effect around the clamping ring 30, where typically the portions of the clamping ring 30 in between the mounting points 34 are further from the surface of the rotor than the portions of the clamping ring 30 around the mounting points 34. For example, as illustrated in FIG. 3, the region midway between two mounting points is further from the surface of the rotor than the regions adjacent to the mounting points 34. This can affect the position of the commutation magnet ring relative to the position sensor, where the distance of the respective commutation magnets (not shown) relative to the surface of the rotor can vary in line with the surface of the clamping ring 30, which can result in errors in determining the rotor magnetic flux angle. To help minimise the distorting effects of the clamping ring a process of gluing the commutation magnet ring to the rotor may be used, however this complicates the manufacturing process and increases the time required for assembling an electric motor.

It is desirable to improve this situation.

In accordance with an aspect of the present invention there is provided a method and arrangement according to the accompanying claims.

The present invention as claimed has the advantage of improving the accuracy of electrical phase measurements by reducing variations in distance between the commutation magnets and the mounting surface of the rotor. The present invention also has the additional advantage of simplifying the manufacturing process for an electric motor or generator while also reducing the time required to assemble an electric motor or generator.

The present invention will now be described, by way of example, with reference to the accompanying drawings, in which.

The embodiment of the invention described is for a rotor for an electric motor or generator having a clamping ring for retaining commutation magnets to the rotor.

For the purposes of the present embodiment the rotor is for an electric motor for use in a wheel of a vehicle, however the electric motor may be located anywhere within the vehicle. The motor is of the type arranged to include a set of coils being part of the stator for attachment to a vehicle, radially surrounded by the rotor carrying a set of magnets mounted on the back iron for attachment to a wheel. For the avoidance of doubt, the various aspects of the invention are equally applicable to a rotor for an electric generator.

As such, the definition of electric motor is intended to include electric generator. As would be appreciated by a person skilled in the art, the present invention is applicable for rotors for use in other types of electric motors.

Figure 1:
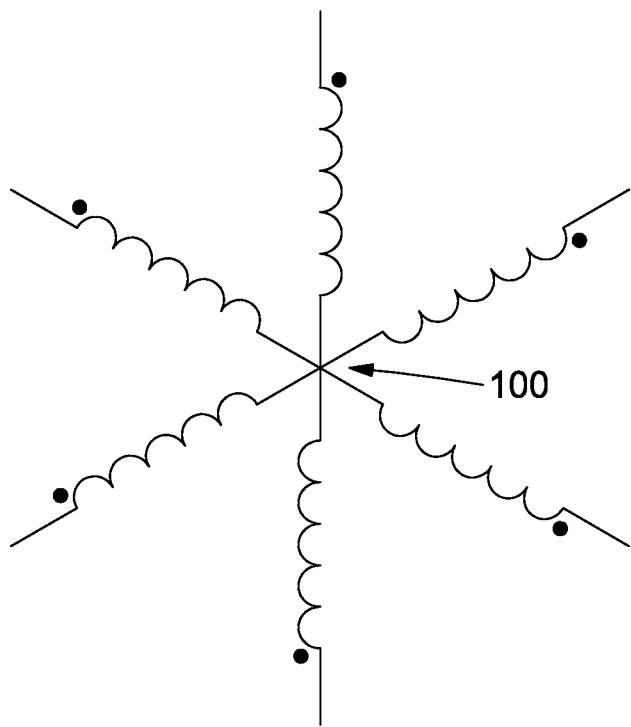
FIG. 1 illustrates a representation of an electric motor.
Figure 2:
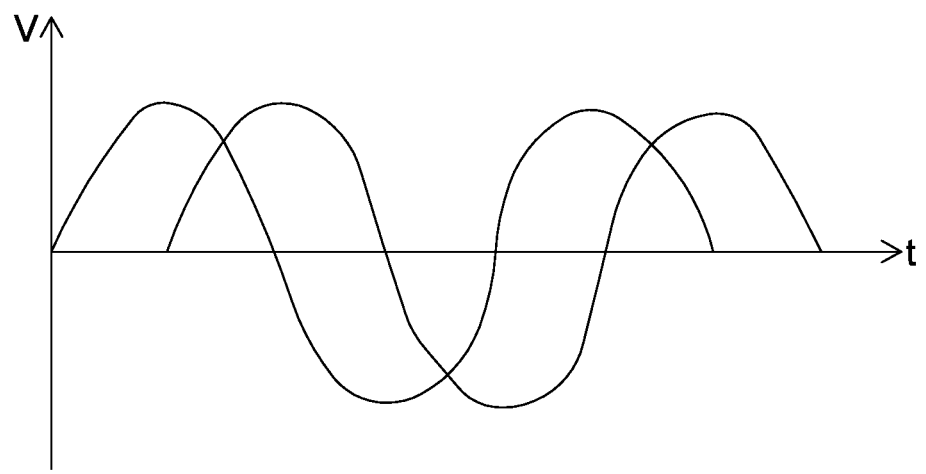
FIG. 2 illustrates a representation of an output from a Hall sensor for determining the position of a rotor.
Figure 3:
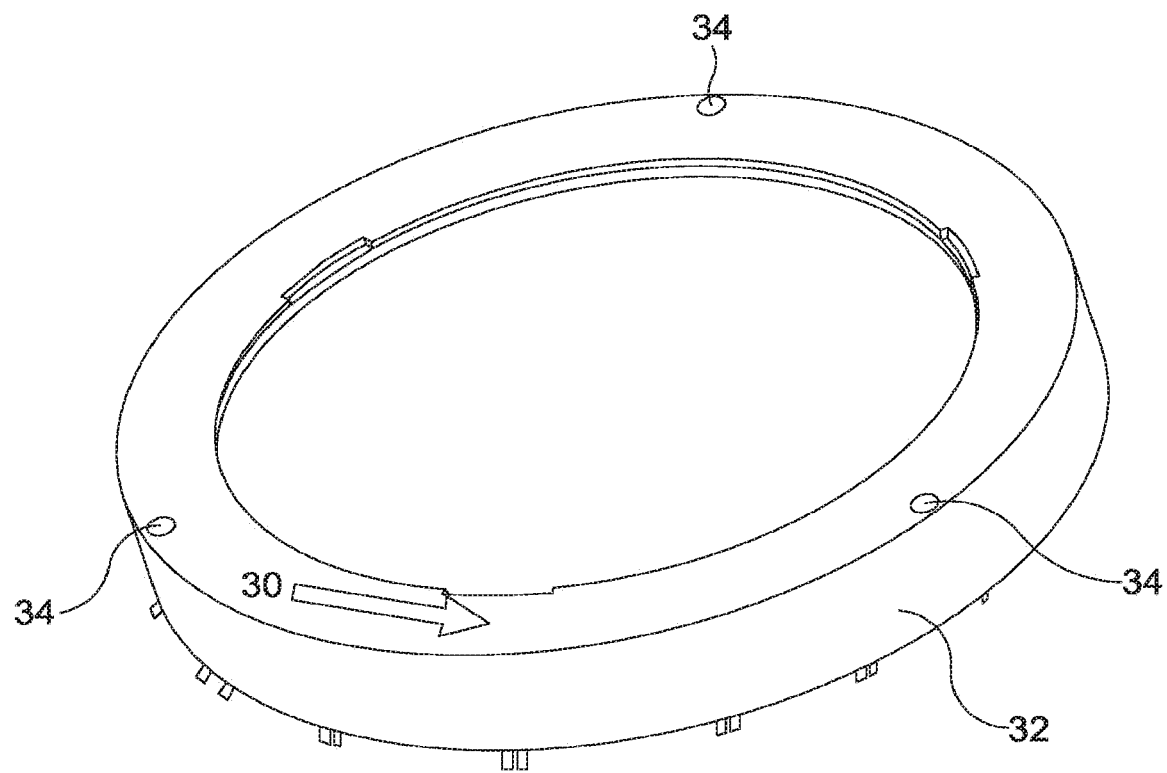
FIG. 3 illustrates a prior art commutation magnet clamping ring.
Figure 4:
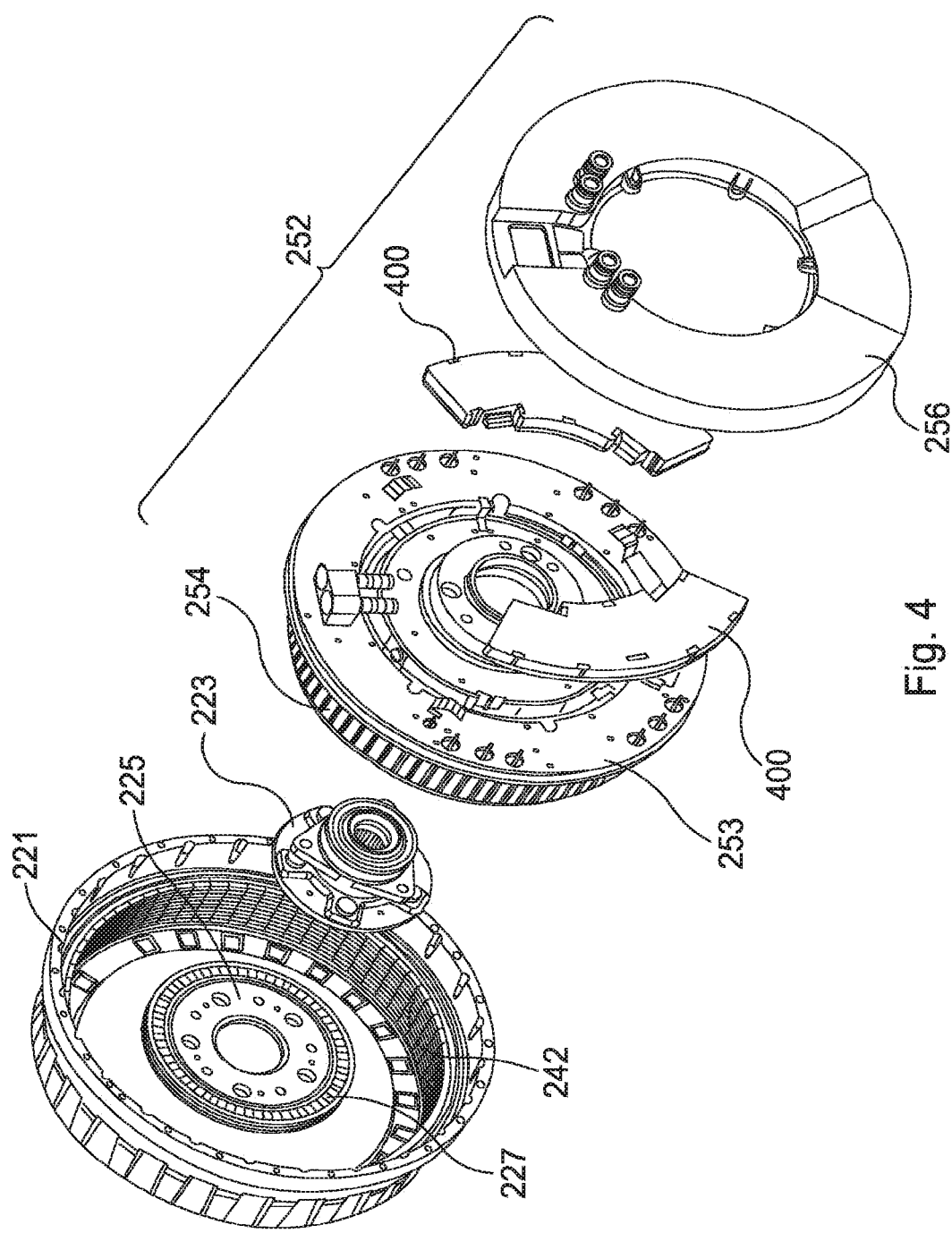
FIG. 4 illustrates an exploded view of a motor according to an embodiment of the present invention.
Figure 5:
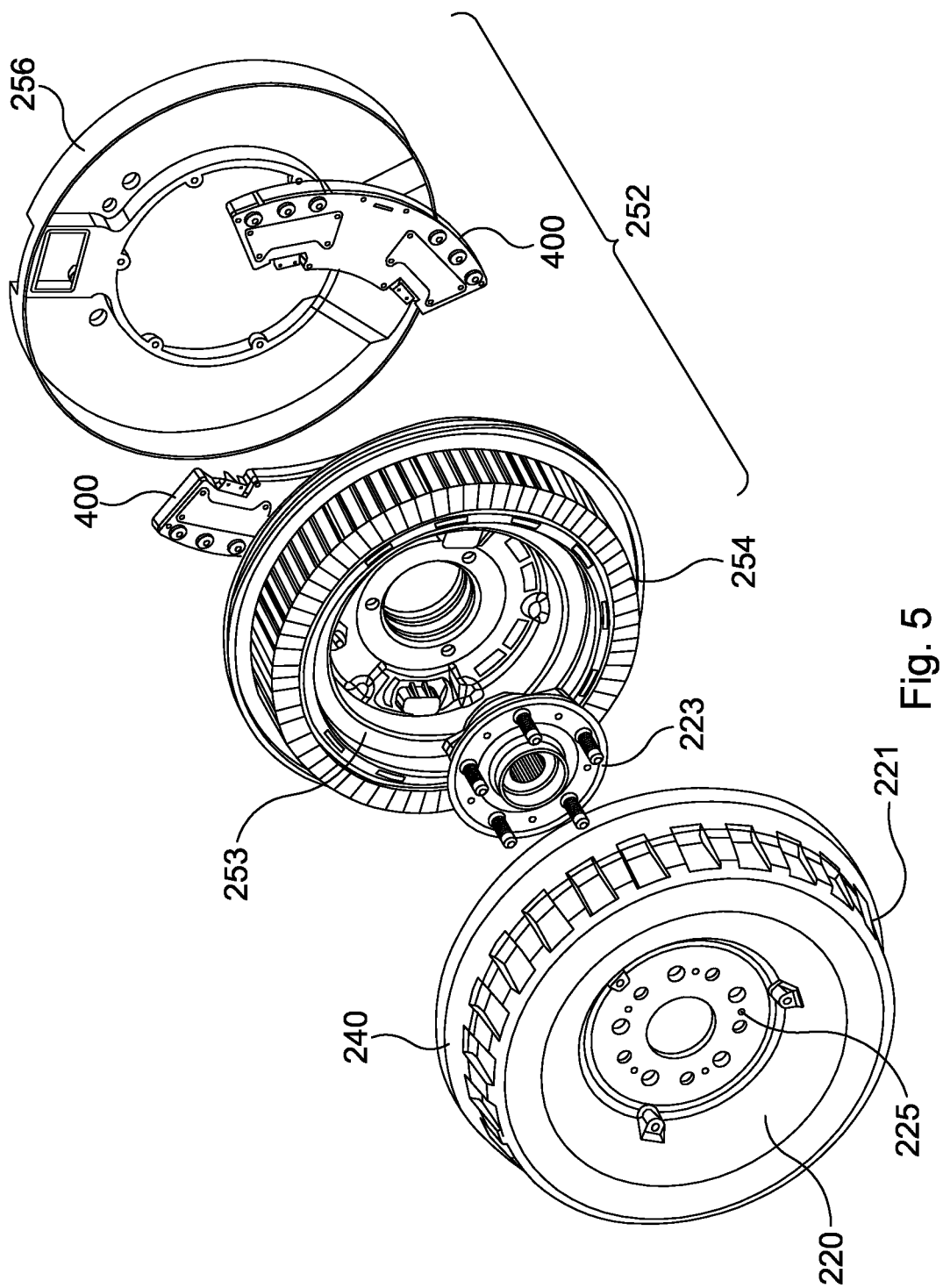
FIG. 5 is an exploded view of the motor of FIG. 4 from an alternative angle.

FIGS. 4 and 5 provide an illustration of an exploded view of a preferred electric motor having a rotor 240 in accordance with an embodiment of the present invention, where FIG. 5 shows an exploded view of the same motor assembly illustrated in FIG. 4 from the opposite side. The in-wheel electric motor includes a stator 252 comprising a heat sink 253, a stator back iron mounted on the heat sink 253 having multiple coils 254 formed on stator tooth laminations to form coil windings, two control devices 400 mounted on the heat sink 253 on a rear portion of the stator for driving the coils, and an annular capacitor, otherwise known as a DC link capacitor, mounted on the stator within the inner radius of the control devices 400. A stator cover 256 is mounted on the rear portion of the stator 252, enclosing the control devices 400 to form the stator 252, which may then be fixed to a vehicle and does not rotate relative to the vehicle during use. The stator back iron is preferably formed from a series of circumferential laminations manufactured from a material having a high permeability, thereby allowing a magnetic field to be formed within the back iron for increasing magnetic flux. Examples of materials used for the back iron include iron or electrical steel (also known as lamination steel, silicon steel or transformer steel). The laminations are typically formed by stamping the desired shape from thin sheets of material, which may typically have a thickness of around 0.35 mm. Preferably the stator tooth laminations are either formed as part of the circumferential laminations or mounted onto the stator back iron after the assembly of the stator back iron.

The rotor 240 comprises a front portion 220 and a cylindrical portion 221 forming a cover, which substantially surrounds the stator 252. The rotor includes a back iron mounted on the inner surface of the cylindrical portion with a plurality of permanent magnets 242 mounted on the inner surface of the back iron and hence are arranged around the inside of the cylindrical portion 221. For the purposes of the present embodiment thirty two magnet pairs are mounted on the inside of the cylindrical portion 221. However, any number of magnet pairs may be used. As with the stator back iron, the rotor back iron is preferably formed from a series of circumferential laminations manufactured from a material having a high permeability, for example electrical steel.

The inner circumference of the back-iron includes a plurality of ridges extending from the axially inner and outer surface of the back-iron, where the ridges project in a radial inward direction. The ridges act as a spacer between magnet elements mounted on the inner circumference of the back-iron that can also be used to facilitate the alignment of magnets mounted on the back-iron. A magnet is arranged to be mounted in between a pair of ridges with adjacent magnets having alternate magnetic polarity.

Preferably, both the stator heat sink and the rotor housing are formed from aluminium or an alloy of aluminium, chosen to be structurally strong yet also light weight and corrosion resistant.

The magnets are arranged to be in close proximity to the coil windings on the stator 252 so that magnetic fields generated by the coils interact with the magnets 242 arranged around the inside of the cylindrical portion 221 of the rotor 240 to cause the rotor 240 to rotate with the respective rotor and stator back irons being utilised to complete the electric motors magnetic circuit. As the permanent magnets 242 are utilized to generate a drive torque for driving the electric motor, the permanent magnets are typically called drive magnets.

A magnetic ring 227 comprising a plurality of magnets, otherwise known as commutation magnets, is provided for identifying the position of the rotor with respect to the stator. Typically the position of the rotor is determined via one or more position sensor, for example a Hall sensor, mounted on the stator, where the one or more position sensor determines the position of the rotor via measurement of the magnetic field generated by the magnetic ring 227.

For improved magnetic field detection, preferably, a commutation focusing ring (not shown) is formed below the magnetic ring 227, which focuses the magnetic field generated by the magnetic ring in a direction perpendicular to the magnetic ring 227. Typically the commutation focusing ring will be formed from a material having a high permeability, for example electrical steel. The magnetic ring 227 is mounted on the rotor to have a matching magnetic configuration to the permanent magnets mounted on the rotor, which act as drive magnets. Accordingly, within the present embodiment the magnetic ring includes thirty two magnet pairs, however any number of magnet pairs may be used. The commutation magnets are used to estimate the rotor magnetic flux angle of the drive magnets. The magnet pairs may be formed by any suitable means, for example separate magnets arranged to form a ring or a single magnetic element arranged to have a plurality of magnet pairs.

An embodiment for mounting the magnetic ring 227 of the inner side of the front portion 220 of the rotor 240 will now be described.

Figure 6:
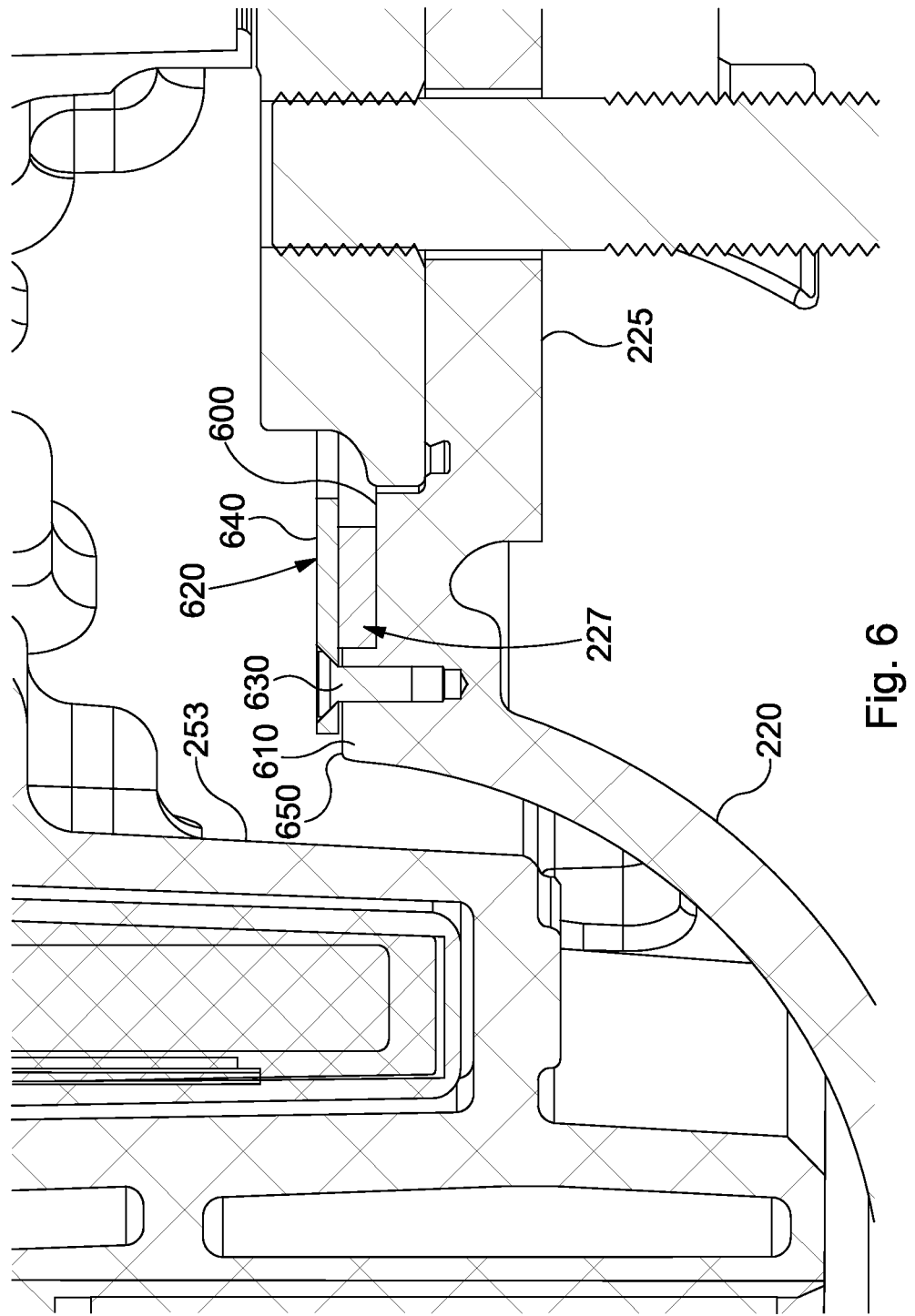
FIG. 6 illustrates a cross sectional view of the electric motor according to an embodiment of the present invention.

FIG. 6 illustrates a cross sectional view of the electric motor where the plurality of commutation magnets, which form the magnetic ring 227, is mounted on an annular disc portion 600 of the rotor that is surrounded by a raised lip 610, where the annular disc portion 600 is formed by a recess bounded by the raised lip 610. The magnetic ring is positioned within the recess. The same reference numerals are used to represent the same features shown in FIG. 4 and FIG. 5.

Preferably, the upper surface 640 of the magnetic ring 227 extends above the upper surface 650 of the raised lip 610 to allow a positive clamping force to be applied to the magnetic ring from the clamping ring 620.

Preferably the plurality of commutation magnets are initially retained to the annular disc portion of the rotor via the use of an adhesive (not shown) placed between the commutation magnets 227 and the rotor surface 600, for example via the use of an adhesive strip or tape. Alternatively other means may be used for initially retaining the commutation magnets to the annular disc portion, for example a spring clip.

Once the commutation magnets have been placed on the annular disc portion 600 of the rotor a clamping ring 620 is positioned over the commutation magnets 227 and attached to the rotor via a retaining element 630, as described below.

Figure 7:
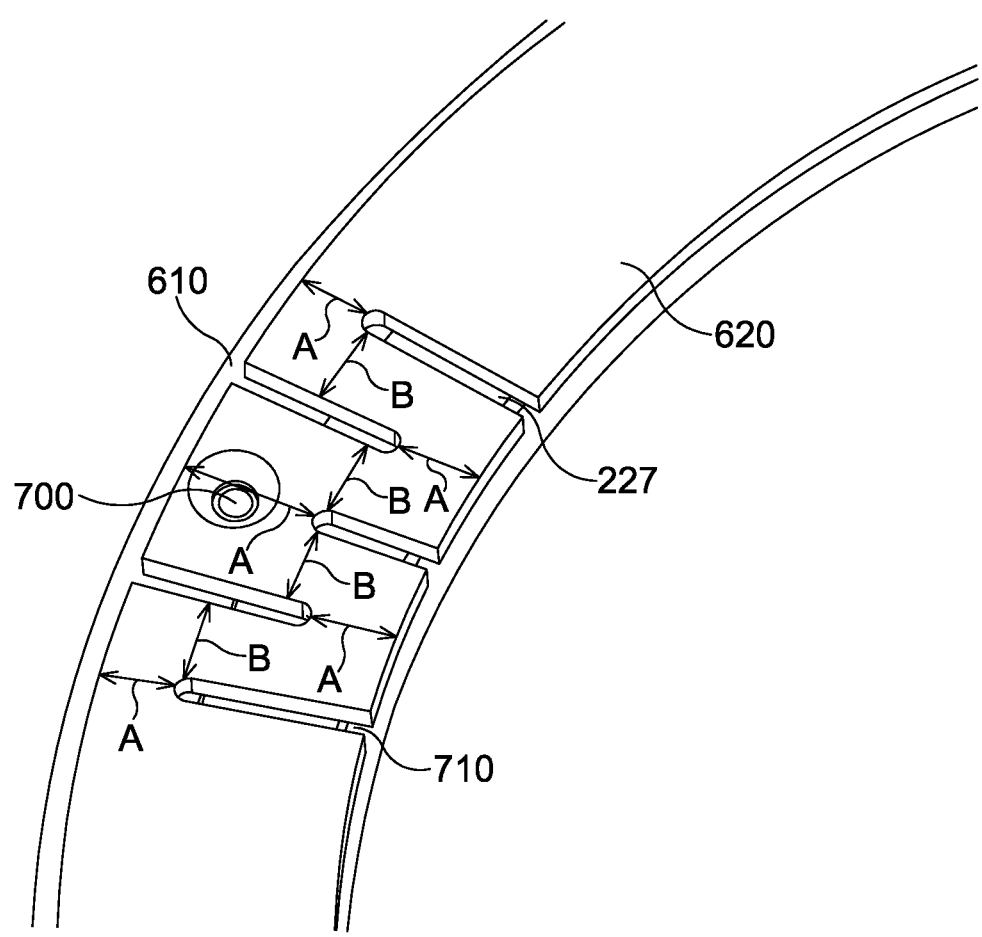
FIG. 7 illustrates a section of a clamping ring according to an embodiment of the present invention.

FIG. 7 illustrates a partial top view of an annular clamping ring 620 that includes a mounting point 700 for mounting the clamping ring 620 to the raised lip 610 formed on the rotor, where the clamping ring 620 is arranged to extend around the annular disc portion upon which the magnetic ring 227 is mounted. As illustrated in FIG. 6, the clamping ring 620 is arranged to retain the magnetic ring 227 to the rotor when mounted to the rotor.

Preferably the mounting point 700 includes an aperture, wherein a retaining element 630 is inserted through the mounting aperture for retaining the annular clamping ring 620 to the rotor housing. Any suitable retaining element may be used, for example a screw or a rivet. Alternatively a spot weld may be used at each of the mounting points.

To restrict any deformation of the clamping ring 620 when mounting the clamping ring 620 to the rotor, as illustrated in FIG. 7, the cross sectional area of the annular clamping ring 620 is reduced in at least one region adjacent to the mounting point 700. Preferably the reduced cross sectional area of the annular clamping ring 620 is achieved via one or more slots 710 formed circumferentially adjacent to a mounting point 700. For the purpose of the present embodiment five slots 710 are formed adjacent to the mounting point 700. This results in any deformation of the clamping ring 620 being localised around the mounting point 700, where the slots 710 formed in the clamping ring 620 localise any distorting forces generated by the retaining element 630 to the area around the mounting point 700. This prevents distortion around the whole clamping ring 620. Consequently, the clamping ring 620 is able to retain the magnetic ring 227 to the rotor with substantially the whole surface of the magnetic ring 227 being maintained at substantially a constant distance from the inner surface 600 of the rotor.

The radial length of the material of the clamping ring 620 that extends beyond the slot, denoted by the letter A in FIG. 7, and the circumferential distance between slots, denoted by the letter B in FIG. 7, define the stiffness of the joint between the mounting point section of the clamping ring 620 and the remainder of the clamping ring 620. The number of slots 710 and the values of A and B can be adjusted to optimise the required clamping force applied to the magnetic ring 227 with appropriate deformation localised around the mounting point 700 to minimise distortion around the clamping ring 620.

Within the present embodiment five circumferential sections adjacent to the mounting point 700 have a reduced radial cross sectional area. However, any number of circumferential sections adjacent to the mounting point 700 may have a reduced radial cross sectional area that allow any deformation forces resulting from mounting the clamping ring 620 to the rotor to be localised to the mounting point 700.

Although the present embodiment localises distortion resulting from mounting the clamping ring 620 to the rotor via the use of radial slots 710 formed adjacent to a mounting point 700, the reduced cross sectional areas formed adjacent to a mounting point 700 may be achieved in an axial direction without extending through the clamp ring.

Figure 8:
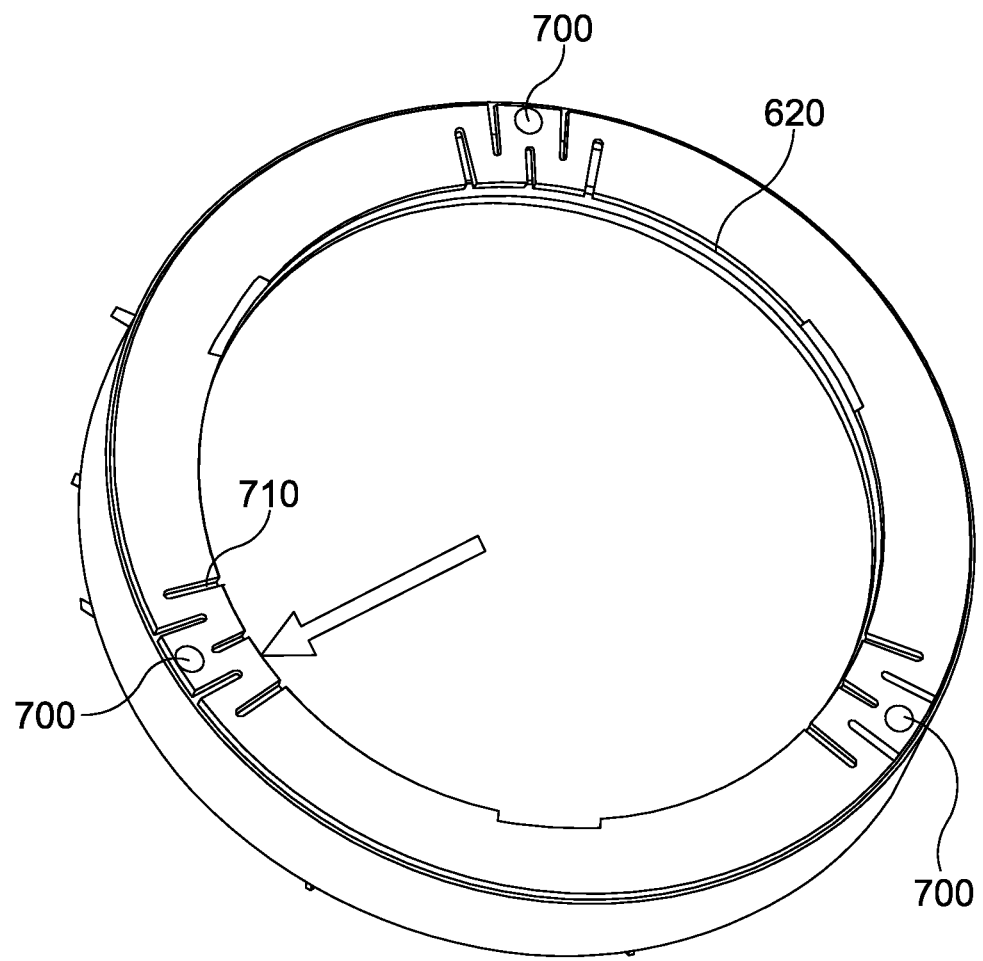
FIG. 8 illustrates a clamping ring according to an embodiment of the present invention.

As illustrated in FIG. 8, within the present embodiment the clamping ring 620 includes three mounting points 700 equidistant from each other, where reduced cross sectional regions are formed adjacent to each mounting point. FIG. 8 also illustrates the height of the clamping ring 620 relative to the inner surface 600 of the rotor, where any deformation of the clamping ring 620 is localised adjacent to each mounting point 700 with the sections of the clamping ring 620 in between the mounting points 700 being maintained at a constant height. Although the present embodiment incorporates three mounting points 700 any number of mounting points 700 may be used that allow the clamping ring 620 to be retained to the rotor while the electric motor is being operated.

Preferably, to further aid retention of the magnetic ring 227 to the rotor, adhesive (not shown) is located between the magnetic ring 227 and the annular clamping ring 620, for example via the application of an adhesive strip or tape.

Following the mounting of the clamping ring to the rotor, the rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

In the present embodiment the electric motor being assembled includes four coil sets with each coil set having three coil sub-sets that are coupled in a wye configuration to form a three phase sub-motor, resulting in the motor having four three phase sub-motors. The operation of the respective sub-motors is controlled via one of the two control devices. However, although the present embodiment describes an electric motor having four coil sets (i.e. four sub motors) the motor may equally have one or more coil sets with associated control devices. In a preferred embodiment the motor includes eight coil sets with each coil set having three coil sub-sets that are coupled in a wye configuration to form a three phase sub-motor, resulting in the motor having eight three phase sub-motors.

Similarly, each coil set may have any number of coil sub-sets, thereby allowing each sub-motor to have two or more phases.

The invention claimed is:

1. A rotor for an electric motor or generator, the rotor comprising a housing having a first surface on which a first set of magnets is mounted; and an annular clamping ring for retaining a second set of magnets to a second surface of the housing, wherein the position of the second set of magnets on the second surface allows the position of the first set of magnets to be determined, wherein the annular clamping ring includes a mounting point for allowing the annular clamping ring to be mounted to the housing for retaining the second set of magnets to the second surface, wherein the cross sectional area of the annular clamping ring is reduced in a region adjacent to the mounting point, wherein the annular clamping ring is mounted over the second set of magnets, and wherein the mounting point is an aperture, wherein a retaining element is inserted through the mounting aperture for retaining the annular clamping ring to the rotor housing.

2. The rotor according to claim 1, wherein the housing includes a circumferential portion.

3. The rotor according to claim 1, wherein the radial cross sectional area of the annular clamping ring is reduced in a region adjacent to the mounting point.

4. The rotor according to claim 1, wherein the annular clamping ring includes a plurality of reduced cross sectional areas located adjacent to the mounting point.

5. The rotor according to claim 1, wherein the annular clamping ring includes a plurality of mounting points having a reduced cross sectional area located adjacent to the respective mounting points.

6. The rotor according to claim 1, wherein adhesive is located between the second set of magnets and the second surface of the rotor housing and between the second set of magnets and the annular clamping ring.

\* \* \* \* \*